United States Patent [19]

Cook

[11] Patent Number: 5,080,483
[45] Date of Patent: Jan. 14, 1992

[54] ALL-REFLECTIVE BORESIGHT TRANSFER OPTICAL SYSTEM

[75] Inventor: Lacy G. Cook, El Segundo, Calif.
[73] Assignee: Hughes Aircraft Company, Los Angeles, Calif.
[21] Appl. No.: 563,146
[22] Filed: Aug. 6, 1990
[51] Int. Cl.[5] .................................. G01B 9/02
[52] U.S. Cl. ..................... 356/154; 250/341; 356/153
[58] Field of Search ............... 356/154, 153, 247, 152; 250/339, 341

[56] References Cited

U.S. PATENT DOCUMENTS

| | | | |
|---|---|---|---|
| 3,752,587 | 8/1973 | Myers et al. | 356/154 |
| 4,139,769 | 2/1979 | McCrum et al. | 250/341 |
| 4,260,254 | 4/1981 | Braun | 356/154 |

Primary Examiner—Samuel Turner
Assistant Examiner—Richard E. Kurtz, II
Attorney, Agent, or Firm—William J. Streeter; Wanda K. Denson-Low

[57] ABSTRACT

The present optical system provides an all-reflective boresight transfer system. A reflective mechanism receives and reflects energy from an incoming collimated beam to focus it upon a target surface. The target surface absorbs and subsequently re-emits as a longer wavelength most of the energy and also reflects a small portion of the energy such that an exit beam comprised of both the re-emitted and reflected energy is reflected through the reflecting mechanism and re-collimated by the reflecting mechanism. The exit beam has the same direction as the input beam except that it is deviated by 180° and laterally offset from the input beam so that the exit beam may be used as a reference for determining or aligning the line of sight of other optical systems.

13 Claims, 2 Drawing Sheets

ALL-REFLECTIVE BORESIGHT TRANSFER OPTICAL SYSTEM

BACKGROUND

1. Technical Field

The present invention relates to all-reflective optical systems and, more particularly, to a boresight transfer system which enables the line of sight of an active laser transmitter system to be transferred and used as a reference to determine the line of sight of or align other optical systems.

2. Discussion

Current state of the art sensor packages which employ active and passive sensors of various wavelengths, such as visible TV, laser rangers or designators, MWIR, and LWIR FLIRS or the like, are utilized to direct a beam onto an object, to illuminate the object, and receive information therefrom. For maximum utility, the direction which each of the above sensors is pointing must be known and oftentimes must be corrected to a common line of sight.

It is desirable to enable testing of the sensors to analyze the boresight alignment, as well as correcting the alignment of the other above sensors, to ensure that the transmitted and received beams are accurately aligned. Relevant art equipment for carrying out boresight alignment testing is relatively bulky, heavy and expensive. A relevant art boresight testers is U.S. Pat. No. 4,260,254 entitled "Compact Boresight Tester for Laser Designators", assigned to the same assignee as the present invention. This art teaches a multiple pass optical system which employs a refractive lens in the entrance and exit paths. Energy efficiency of this type of boresight tester is very low due to the overlap of the beam on the various optical surfaces during multiple passes. Also, applications that involve the conversion of the laser energy to MWIR and LWIR, through heating of the surface located at the input laser focus, is limited because of the difference in refractive index of the lens material between the laser wavelength and the MWIR or LWIR, thus producing boresight error.

SUMMARY OF THE INVENTION

According to the teachings of the present invention, a boresight transfer system is provided without movable parts or electric power which enables common boresighting of several sensors to be achieved. The present invention provides an all-reflective boresight transfer system which eliminates the disadvantages of refractive optical systems. The present invention is capable of being manufactured in a small compact size. The small size enables the device to be mounted within a sensor package turret to enable periodic boresight verification during sensor operation. The present invention is relatively simple with respect to its optics and mechanics. The present invention has a relatively low fabrication and alignment cost. The present invention provides ruggedness to shock, vibration and temperature changes. Also, the present invention provides high energy efficiency at all wavelengths due to its all-reflective, nonoverlapping optical path.

In the preferred embodiment, the all-reflective boresight transfer system is comprised of the following. A reflective mechanism for reflecting energy from a laser beam or the like. The reflecting mechanism focuses and reflects the laser beam to a target surface. The target surface is positioned to receive the energy from the laser beam such that the majority of the incident energy is absorbed by the target surface and subsequently re-emitted at longer wavelengths as thermal radiation, and a minority of the incident energy of the laser beam is specularly reflected from the target surface. Both the re-emitted thermal energy and the reflected energy are recollimated by the reflecting mechanism, and both can be used as a reference for determining the line of sight of other optical systems.

BRIEF DESCRIPTION OF THE DRAWINGS

The various advantages of the present invention will become apparent to those skilled in the art after a study of the following specification and by reference to the drawings in which.

DESCRIPTION OF THE PREFERRED EMBODIMENT

Figure 1:
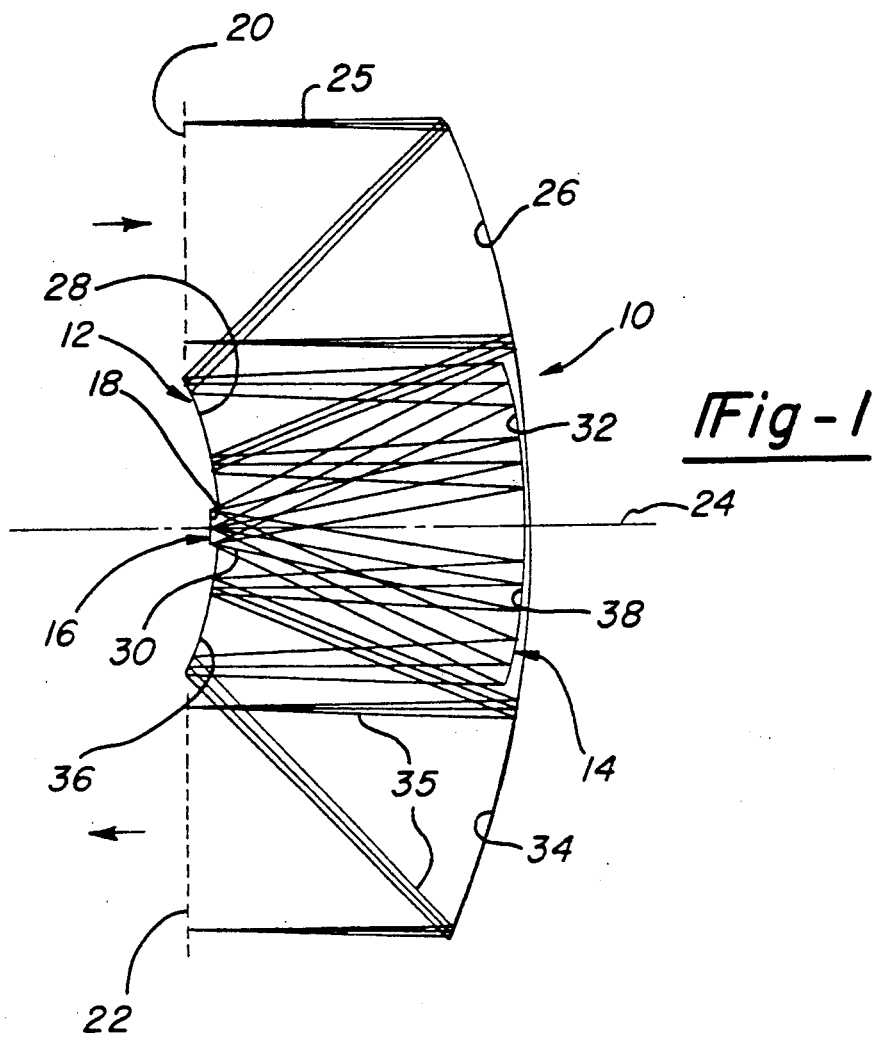
FIG. 1 is a schematic diagram of the plane containing the lateral offset of the input and output apertures of an apparatus in accordance with the teaching of the present invention.
Figure 2:
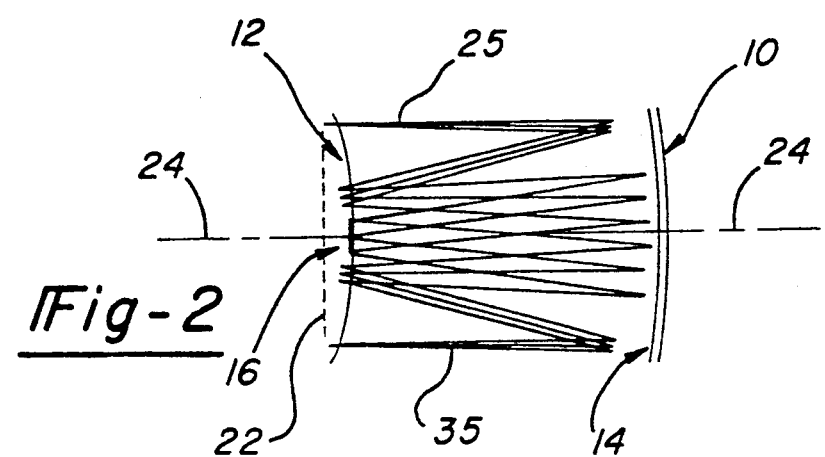
FIG. 2 is a schematic diagram of the plane perpendicular to the plane of FIG. 1.
Figure 3:
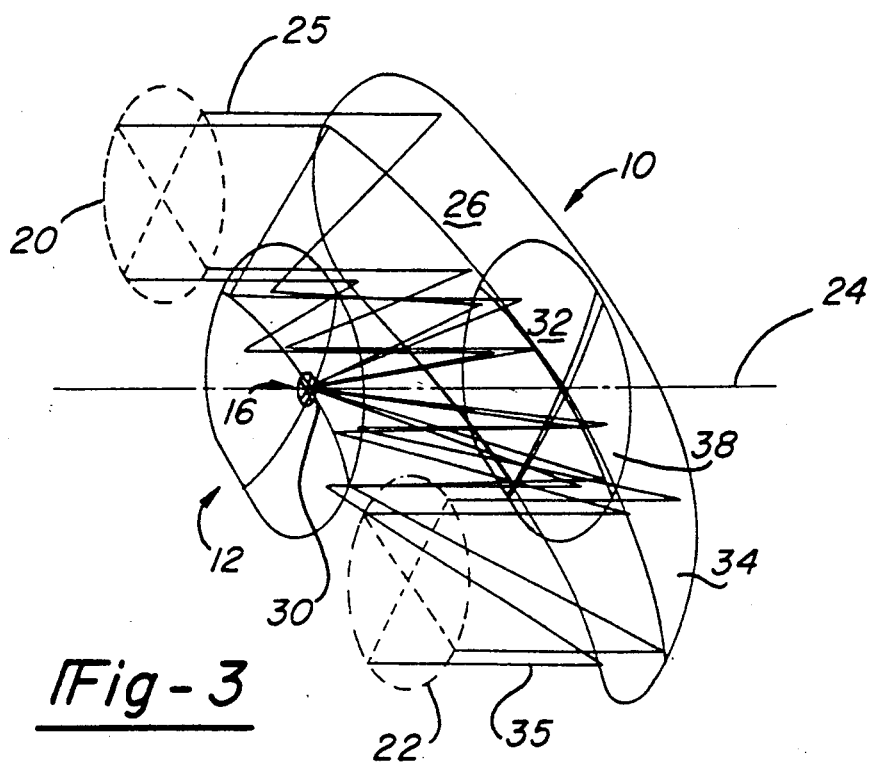
FIG. 3 is a schematic diagram of a perspective view of FIG. 1.

Referring to FIGS. 1-3, an all-reflective boresight transfer system is shown including a primary 10, secondary 12, and tertiary 14 mirror focusing on a target 16. The system also includes an entrance aperture 20 and an exit aperture 22. The entrance aperture 20 and exit aperture 22 are offset with respect to the primary mirror 10 such that the apertures 20 and 22 are laterally positioned with respect to one another.

The primary mirror 10 includes a central axis 24 defining the system optical axis. The primary mirror 10 includes at least one positive power primary mirror surface 26 which may be a spheric, conic or higher order aspheric mirror surface.

The secondary mirror 12 includes at least one negative power secondary mirror surface 28 which may be of a spheric, conic or higher order aspheric mirror surface. The secondary mirror may include a central opening 30. The secondary mirror 12 has a diameter smaller than the primary mirror 10.

The tertiary mirror 14 includes at least one positive power tertiary mirror surface 32 which may be of a spheric, conic or a higher order aspheric mirror surface.

The target 16 is a disk shaped mirror which functions to both absorb and reflect certain portions of the energy which is reflected at it. Generally the target 16 absorbs and subsequently re-emits at a longer wavelength about 90% of the laser beam energy and reflects 10% of the laser beam energy. The target 16 has a reflective quarternary surface 18 facing the tertiary mirror 14 and is generally positioned so that energy passes through the central opening 30 of the secondary mirror 12 to the target 16. Specific exemplary materials which may be employed for the target are polished stainless steel, polished aluminum, or the like. Although it should be understood that alternate materials, which are also suitable, may be employed. The target should be of a material that when locally heated, emits radiation characteristics of its elevated temperature.

The primary mirror 10 also includes a second positive power quinary mirror surface 34. The quinary mirror surface 34 may be a spheric, conic or higher order aspheric mirror surface and its optical surface figure may be substantially similar or identical to that of primary mirror surface 26. The quinary mirror surface 34 may be continuous with the primary mirror surface 26 or may be a separate machined surface.

The secondary mirror 12 also includes a second negative power sextiary mirror surface 36. The sextiary mirror surface 36 may be a spheric, conic or higher order aspheric mirror surface and its optical surface figure may be substantially similar or identical to that of secondary mirror surface 28. The sextiary mirror surface 36 may be continuous with the secondary mirror surface 28 or may be a separate machined surface.

The tertiary mirror 14 also includes a second positive power septiary mirror surface 38. The septiary mirror surface 38 may be a sphere, conic or a higher order aspheric mirror surface and its optical surface figure may be substantially similar or identical to that of tertiary mirror surface 32. The septiary mirror surface 38 may be continuous with the tertiary mirror surface 32 or may be a separate machined surface.

In operation, during line of sight verification use, a laser ranger/designator is fired into the entrance aperture 20. The laser energy, illustrated by rays 25, is received and reflected from the primary mirror surface 26 to the secondary mirror surface 28, from the secondary mirror surface 28 to the tertiary mirror surface 32 and from the tertiary mirror surface 32, the laser beam energy passes through the central opening 30 of the secondary mirror 12 to the target 16. The primary 26, secondary 28 and tertiary 32 mirror surfaces focus the laser energy onto the target 16. Most of the laser energy is absorbed by the target 16. A small portion of laser energy is specularly reflected from the target quarternary surface 18. The target 16 is locally heated by the absorbed energy and emits infrared radiation characteristic of its elevated temperature. The emitted infrared and reflected laser energy, designated by rays 35, is recollimated by a substantially similar or identical optical path reflecting to the septiary 38, sextiary 36 and quinary 34 mirror surfaces as best seen in FIGS. 1 and 3. The laser and IR energy is reflected through the exit aperture 22 with substantially the same line of sight as the incoming laser beam, although deviated by 180°. The output is laterally shifted, as seen in FIGS. 1 and 3, with respect to the entrance aperture 20 so that it can be directed into a separate sensor aperture such as visible TV, MWIR, or LWIR FLIR apertures for alignment of the sensors. The lateral shifting also provides for a non-overlapping optical path of the rays or the laser beam within the optical system.

The primary 10, secondary 12 and tertiary 14 mirrors are of such a size that the beams reflect on the primary 26, secondary 28 and tertiary 32 mirror surfaces of the primary 10, secondary 12, and tertiary 14 mirrors, respectively, on the way to the target 16 and on the septiary 38, sextiary 36 and quinary 34 mirror surfaces of the tertiary 14, secondary 12 and primary 10 mirrors, respectively, during reflecting of the beams after being emitted or reflected from the target 16. Thus, the beam is not overlapped and is laterally offset from the entrance aperture 20 to the exit aperture 22. The invention has a substantial field of view in the region of about 2° to allow for angular misalignment of the boresight transfer unit to the input laser. The output beam line of sight is parallel to the input beam line of sight to an accuracy of better than 50 mrads over the field of view. Also, the above six power mirror surfaces may be on separate mirrors increasing the number of powered mirrors from three to six.

The present invention may be constructed entirely of aluminum where the reflecting surfaces, rotational symmetric general aspherics, and the necessary alignment surfaces and references are held to very tight tolerances by precision diamond machining. Assembly and alignment is a simple bolt together process. The unit is rugged, athermal and low cost.

A specific prescription for the system in accordance with the present invention is as follows.

TABLE I

OPTICAL PRESCRIPTION OF A SPECIFIC EMBODIMENT OF THE OPTICAL SYSTEM OF THE PRESENT INVENTION

| # | DESCRIP. | RADIUS | CONIC CONSTANT | AD | AE | AF | AG | THICKNESS |
|---|---|---|---|---|---|---|---|---|
| 20 | Entrance Aperture* | ∞ | — | — | — | — | — | 3.759 |
| 26 | Primary Mirror Surface | −5.000 | −1.3317 | 6.427E-5 | 5.800E-6 | −4.705E-8 | 1.720E-7 | −1.749 |
| 28 | Secondary Mirror Surface | −2.500 | −11.203 | 6.046E-3 | 4.852E-3 | −1.633E-3 | 6.276E-5 | 0.900 |
| 32 | Tertiary Mirror Surface | −5.000 | −46.858 | 2.842E-2 | 1.088E-1 | −4.917E-1 | 9.023E-1 | −0.705 |
| 18 | Quarternary Mirror Surface (Target) | ∞ | — | — | — | — | — | 0.705 |
| 38 | Septiary Mirror Surface | −5.000 | −46.858 | 2.842E-2 | 1.088E-1 | −4.917E-1 | 9.023E-1 | −0.900 |
| 36 | Sextiary Mirror Surface | −2.500 | −11.203 | 6.046E-3 | 4.852E-3 | −1.633E-3 | 6.276E-5 | 1.749 |
| 34 | Quinary Mirror Surface | −5.000 | −1.3317 | 6.427E-5 | 5.800E-6 | −4.705E-8 | 1.720E-7 | −3.759 |

TABLE I-continued
OPTICAL PRESCRIPTION OF A SPECIFIC
EMBODIMENT OF THE OPTICAL SYSTEM OF THE
PRESENT INVENTION

| # | DESCRIP. | RADIUS | CONIC CONSTANT | AD | AE | AF | AG | THICKNESS |
|---|---|---|---|---|---|---|---|---|
| 22 | Exit Aperture* | ∞ | — | — | — | — | — | — |

*Entrance and exit aperture diameters are 1.200;
Lateral Offsets are +1.500 and −1.500, respectively, to the aperture center
Device field of view is ±1.0 degree
All mirrors have a common system optical axis such as 24 in FIG. 1

Figure 4:
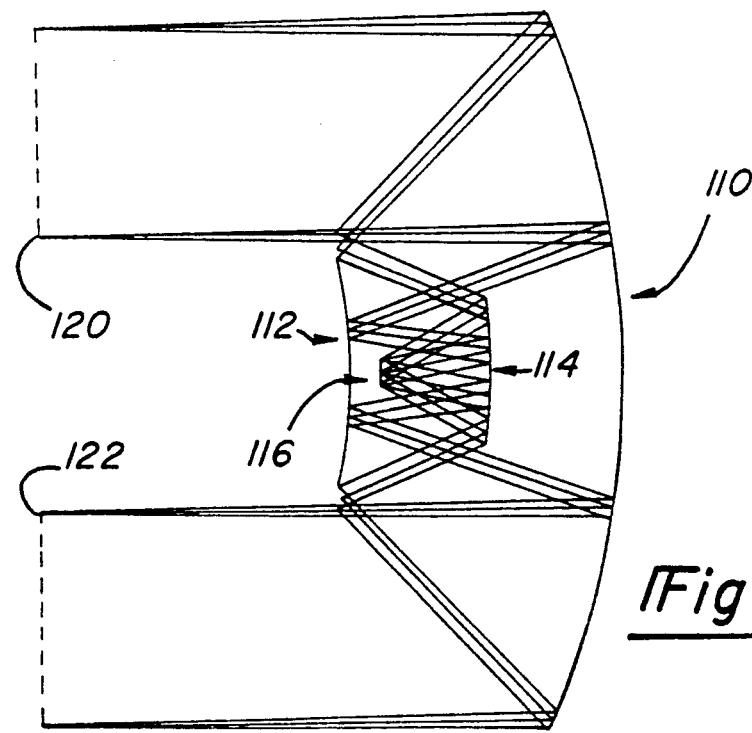
FIG. 4 is a schematic diagram of the plane containing the lateral offset of the input and output apertures of another apparatus in accordance with the teaching of the present invention.

Surface sag = $\dfrac{c\rho^2}{1 + \sqrt{1 - (K+1)c^2\rho^2}} + AD\rho^4 + AE\rho^6 + AF\rho^8 + AG\rho^{10}$ $c = 1/\text{Radius}$
$K = \text{Conic Constant}$
$\rho^2 = x^2 + y^2$ Turning to FIG. 4, an alternate embodiment of the present invention is illustrated. In FIG. 4, the primary 110, secondary 112, tertiary 114 mirrors and target 116 are substantially the same as those previously described. The secondary mirror lacks the central opening and the tertiary mirror 114 and target 116 are positioned such that the tertiary mirror 118 is substantially in front of the primary mirror 10 and the target is substantially in front of the secondary mirror 112 as seen in FIG. 4. The primary 110, secondary 112 and tertiary 114 mirrors have the six power mirror surfaces like those previously described. Also, the surfaces of the mirror surfaces are similar to those previously described. The entrance aperture 120 and exit aperture 122 are substantially in front of the secondary mirror 112 instead of in line with the secondary mirror of the first embodiment.

The present invention has application in tactical devices such as ground-based and airborne sensor packages where laser, visible TV, and FLIR sensors operate on the same gimbal. Also, the present invention may be utilized to align missile tracking sensors and modular sensor concepts for unmanned vehicles. Further, strategic target location sensors may be aligned with the present invention. The present invention functions over a broad spectral band and has a higher transmission due to the lack of overlap of the optical path within the optical system. The present invention provides an all-reflective boresight transfer system which is an improvement over existing techniques in terms of size, simplicity, cost, ruggedness, thermal efficiency, lack of spectral limitations and athermal operation.

It should be understood that while this invention has been described in connection with a particular example hereof, that various modifications, alterations and variations of the preferred embodiments can be made after having the benefit of the study of the specification, drawings and subjoined claims.

What is claimed is:

1. An all-reflective boresight transfer system comprising:
   reflecting means for reflecting energy from a substantially collimated incoming beam and for enabling for angular misalignment of said beam, said reflecting means focusing and reflecting said incoming beam;
   target means for absorbing and subsequently re-emitting a large portion of energy from said reflecting means at a wavelength different from said incoming beam, said target means positioned to receive energy from said reflecting means and said target means reflecting a small portion of energy at the same wavelength as said incoming beam such that both the said re-emitted and said reflected energy are reflected through and recollimated by said reflecting means so that an exit beam may be used as a reference for determining line of sight of or for aligning other optical systems.

2. The all-reflective boresight transfer system according to claim 1 wherein the exit beam exits said system at a substantially identical line of sight as said incoming beam except it is deviated by 180°.

3. The all-reflective boresight transfer system according to claim 2 wherein said exit beam is laterally shifted with respect to said incoming beam so that it is directed to a separate aperture and the exit beam and incoming beam do not overlap.

4. The all-reflective boresight transfer system according to claim 1 wherein said reflecting means is further comprised of a three mirror optical system each mirror having a pair of reflecting surfaces.

5. An all-reflective boresight transfer system comprising:
   a primary mirror;
   a secondary mirror facing said primary mirror such that energy from an incoming beam directed into said primary mirror is reflected to said secondary mirror;
   a tertiary mirror facing said secondary mirror such that the energy from the incoming beam is reflected from said secondary mirror to said tertiary mirror;
   target means for absorbing and subsequently re-emitting a large portion of the energy at a wavelength different from said incoming beam, said target means positioned to receive the energy from said tertiary mirror, said target means reflecting a small portion of said received energy at the same wavelength as the incoming beam such that an exit beam comprised of both said re-emitted and said reflected energy is recollimated by said tertiary, secondary and primary mirrors and is reflected from the system for use as a boresight reference beam for sensors or for determining line of sight of the sensors.

6. The all-reflective boresight transfer system according to claim 5 wherein said primary mirror has one or more positive power mirror surfaces.

7. The all-reflective boresight transfer system according to claim 6 wherein said one or more primary mirror surface has a spheric, conic, or higher order aspheric configuration.

8. The all-reflective boresight transfer system according to claim 5 wherein said secondary mirror has one or more negative power mirror surfaces.

9. The all-reflective boresight transfer system according to claim 8 wherein said one or more secondary mirror surface has a spheric, conic, or higher order aspheric configuration.

10. The all-reflective boresight transfer system according to claim 5 wherein said tertiary mirror has one or more positive power mirror surfaces.

11. The all-reflective boresight transfer system according to claim 10 wherein said one or more tertiary mirror surface has a spheric, conic or higher order aspheric configuration.

12. The all-reflective boresight transfer system according to claim 5 wherein the exit beam exits said system at a substantially identical line of sight as said incoming beam except it is deviated by 180°.

13. The all-reflective boresight transfer system according to claim 5 wherein said exit beam is laterally shifted with respect to said incoming beam so that it is directed to a separate aperture and said exit beam and incoming beam do not overlap.

* * * * *